(12) United States Patent
Weng et al.

(10) Patent No.: US 12,021,410 B2
(45) Date of Patent: Jun. 25, 2024

(54) THREE-PHASE UNINTERRUPTIBLE POWER SYSTEM AND OPERATION METHOD

(71) Applicant: CYBER POWER SYSTEMS, INC., Taipei (TW)

(72) Inventors: Jung-Hua Weng, Taipei (TW); Ming-Chuan Lin, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 11 days.

(21) Appl. No.: 18/117,005

(22) Filed: Mar. 3, 2023

(65) Prior Publication Data
US 2024/0178699 A1    May 30, 2024

(30) Foreign Application Priority Data

Nov. 25, 2022   (CN) .......................... 202211489913.5

(51) Int. Cl.
| | |
|---|---|
| H02J 9/06 | (2006.01) |
| H02J 7/00 | (2006.01) |
| H02M 1/08 | (2006.01) |
| H02M 7/217 | (2006.01) |

(52) U.S. Cl.
CPC ............. *H02J 9/061* (2013.01); *H02J 7/0013* (2013.01); *H02M 1/08* (2013.01); *H02M 7/217* (2013.01); *H02J 2207/20* (2020.01)

(58) Field of Classification Search
CPC ...... H02J 9/061; H02J 7/0013; H02J 2207/20; H02M 1/08; H02M 7/217
See application file for complete search history.

(56) References Cited

U.S. PATENT DOCUMENTS 5,745,356 A * 4/1998 Tassitino, Jr. ......... H02M 7/493
307/65

\* cited by examiner

*Primary Examiner* — Carlos Amaya
(74) *Attorney, Agent, or Firm* — BACON&THOMAS, PLLC

(57) ABSTRACT

A three-phase uninterruptible power system and an operation method thereof are provided. The three-phase uninterruptible power system comprises a DC bus, three power conversion circuits and a control circuit. When the three-phase uninterruptible power system enters a line mode from a battery mode, the control circuit performs a huge current suppression for each power conversion circuit according to a predetermined sequence. The huge current suppression performed for any of the power conversion circuits comprises the following steps: disabling the DC-DC conversion of the power conversion circuit, and having the other two power conversion circuits to additionally share the original load of the disabled power conversion circuit; and after the DC-DC conversion of the power conversion circuit is disabled, enabling the AC-DC conversion of the power conversion circuit, and having the power conversion circuits revert to their original load.

18 Claims, 21 Drawing Sheets

THREE-PHASE UNINTERRUPTIBLE POWER SYSTEM AND OPERATION METHOD

BACKGROUND OF THE INVENTION

Field of the Invention

The present invention relates to the technical field of power supplying, and more particularly, to a three-phase uninterruptible power system and an operation method thereof.

Description of Related Art

There is a kind of three-phase uninterruptible power system, in which the three power conversion circuits all adopt a circuit design, and this circuit design can perform both AC-DC conversion and DC-DC conversion. However, when this kind of three-phase uninterruptible power system enters the line mode from the battery mode, it simultaneously disables the DC-DC conversion of its three power conversion circuits, and then simultaneously enables the AC-DC conversion of its three power conversion circuits, thus causing a huge current (whose frequency is the same or similar to the frequency of the grid source) at the moment of switching different operations, resulting in a large impact (also called a huge current impact) on the grid source. Once the grid source is impacted by a certain degree of huge current, the voltage and/or frequency of the grid source will drop, seriously affecting the power supply stability and power supply reliability of the grid source.

SUMMARY OF THE INVENTION

An object of the present invention is to provide a three-phase uninterruptible power system, which will not cause a huge current impact on the grid source when it enters the line mode from the battery mode.

Another object of the present invention is to provide an operation method of a three-phase uninterruptible power system.

To achieve the above object, the present invention provides a three-phase uninterruptible power system, which comprises a DC bus, three power conversion circuits and a control circuit. Each of the power conversion circuits is electrically coupled to the DC bus, a battery pack and one phase of a three-phase power. Each of the power conversion circuits is configured for performing an AC-DC conversion and a DC-DC conversion. As for the control circuit, it is electrically coupled to the power conversion circuits. When the three-phase uninterruptible power system enters a line mode from a battery mode, the control circuit performs a huge current suppression for each power conversion circuit according to a predetermined sequence. The huge current suppression performed for any of the power conversion circuits comprise the following steps: disabling the DC-DC conversion of the power conversion circuit, and having the other two power conversion circuits to additionally share the original load of the disabled power conversion circuit; and after the DC-DC conversion of the power conversion circuit is disabled, enabling the AC-DC conversion of the power conversion circuit, and having the power conversion circuits revert to their original load.

To achieve the above another object, the present invention provides an operation method of a three-phase uninterruptible power system. The three-phase uninterruptible power system comprises a DC bus and three power conversion circuits. Each power conversion circuit is electrically coupled to the DC bus, a battery pack and one phase of a three-phase power. Each power conversion circuit is configured to perform an AC-DC conversion and a DC-DC conversion. The operation method comprises the following steps: determining whether the three-phase uninterruptible power system enters a line mode from a battery mode; and when the determination is positive, performing a huge current suppression for each power conversion circuit according to a predetermined sequence. The huge current suppression performed for any of the power conversion circuits comprises the following steps: disabling the DC-DC conversion of the power conversion circuit, and having the other two power conversion circuits to additionally share the original load of the disabled power conversion circuit; and after the DC-DC conversion of the power conversion circuit is disabled, enabling the AC-DC conversion of the power conversion circuit, and having the power conversion circuits revert to their original load.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
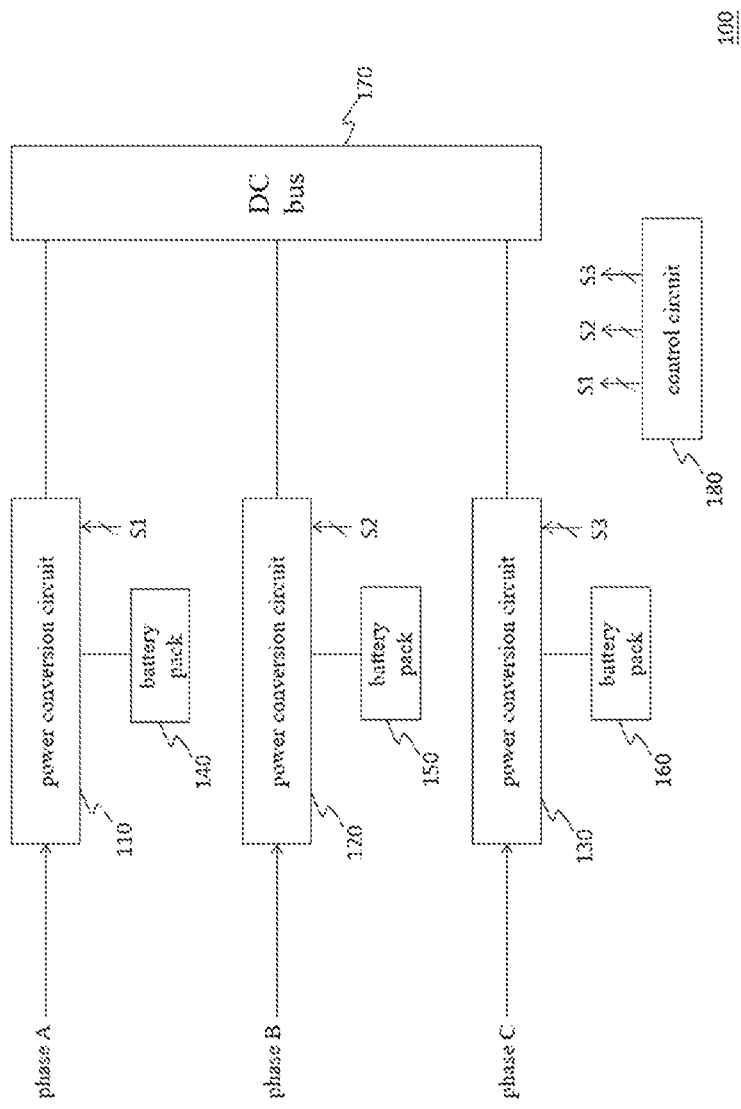
FIG. 1 shows a part of a three-phase uninterruptible power system according to an embodiment of the present invention.

FIG. 1 shows a part of a three-phase uninterruptible power system according to an embodiment of the present invention. Referring to FIG. 1, the three-phase uninterruptible power system 100 comprises power conversion circuits 110-130, battery packs 140-160, a DC bus 170 and a control circuit 180. It is worth mentioning that, in other embodiments, the three-phase uninterruptible power system 100 may not comprise the battery packs 140-160, but use external battery packs. Referring to FIG. 1 again, each power conversion circuit is electrically coupled to the DC bus 170, one of the battery packs 140-160 and one phase of a three-phase power (that is, one of phase A, phase B and phase C) The three power conversion circuits all adopt a circuit design (described in detail later), and this circuit design can perform both AC-DC conversion and DC-DC conversion. In other words, each power conversion circuit is configured to perform AC-DC conversion and DC-DC conversion. In addition, in this embodiment, each power conversion circuit can also perform a soft-start operation, which will be described in detail later. As for the control circuit 180, it is electrically coupled to the power conversion circuits 110-130, and provides control signal groups S1-S3 to the power conversion circuits 110-130, respectively, so as to control the operation of the power conversion circuits 110-130.

Figure 2:
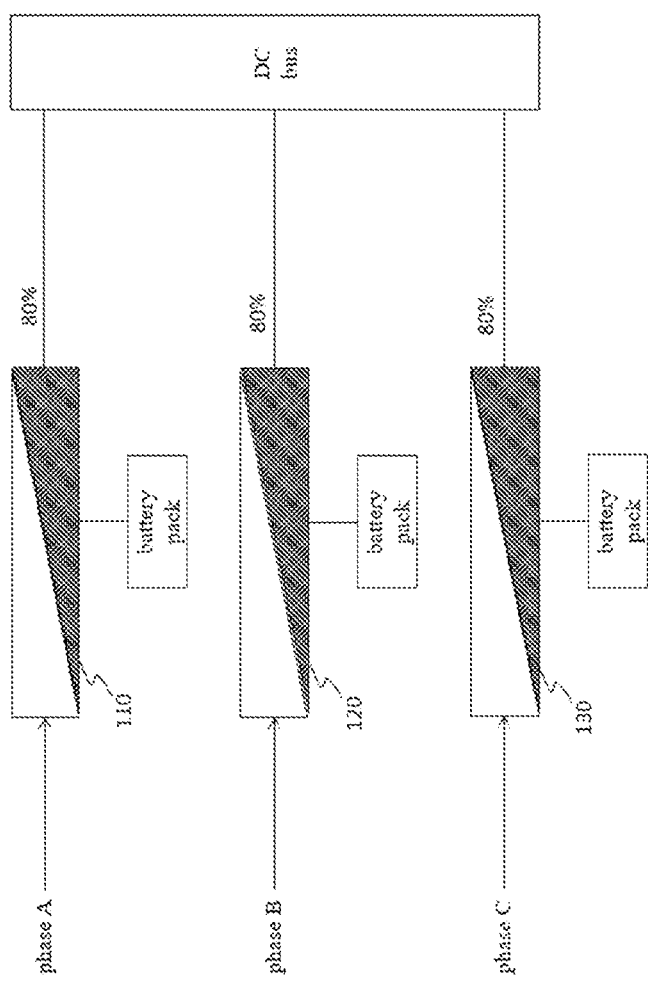
FIG. 2 shows one setting of the load rates of the power conversion circuits of the three-phase uninterruptible power system 100 in the battery mode.

When the three-phase uninterruptible power system 100 enters the line mode from the battery mode, the control circuit 180 performs a huge current suppression for each power conversion circuit according to a predetermined sequence. In this embodiment, the predetermined sequence is phase A, phase B, and phase C. Referring to FIG. 2, for the convenience of description, the following description assumes that each power conversion circuit runs at 80% load rate when the three-phase uninterruptible power system 100 is in the battery mode.

Figure 3:
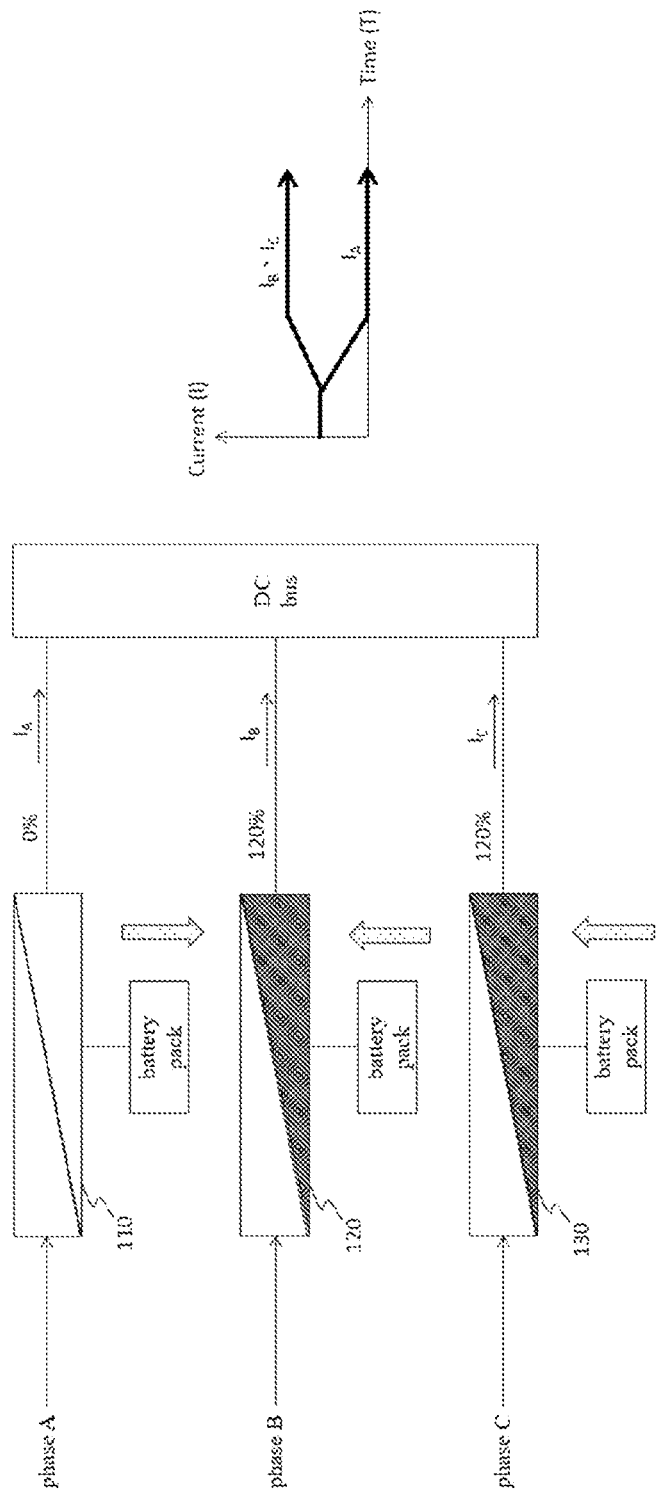
FIG. 3 shows the load rate variation and the output current variation of each power conversion circuit when the power conversion circuit 110 executes the first step of the huge current suppression.

According to the above predetermined sequence, when the three-phase uninterruptible power system 100 enters the online mode from the battery mode, the control circuit 180 will perform a huge current suppression for the power conversion circuit 110 corresponding to phase A at first. The huge current suppression performed by the control circuit 180 for the power conversion circuit 110 comprises two steps. Referring to FIG. 3, in the first step, the control circuit 180 disables the DC-DC conversion of the power conversion circuit 110, and has the other two power conversion circuits (i.e., the power conversion circuits 120 and 130) to additionally share the original load of the disabled power conversion circuit 110. In this embodiment, the power conversion circuits 120 and 130 share the original load of the disabled power conversion circuit 110 equally. As shown in FIG. 3, the load rate of the power conversion circuit 110 is decreased to 0%, so the output current $I_A$ of the power conversion circuit 110 is decreased to 0. In addition, the load rate of the power conversion circuits 120 and 130 are both increased to 120%, so the output currents $I_B$ and $I_C$ of the power conversion circuits 120 and 130 are both increased.

Figure 4:
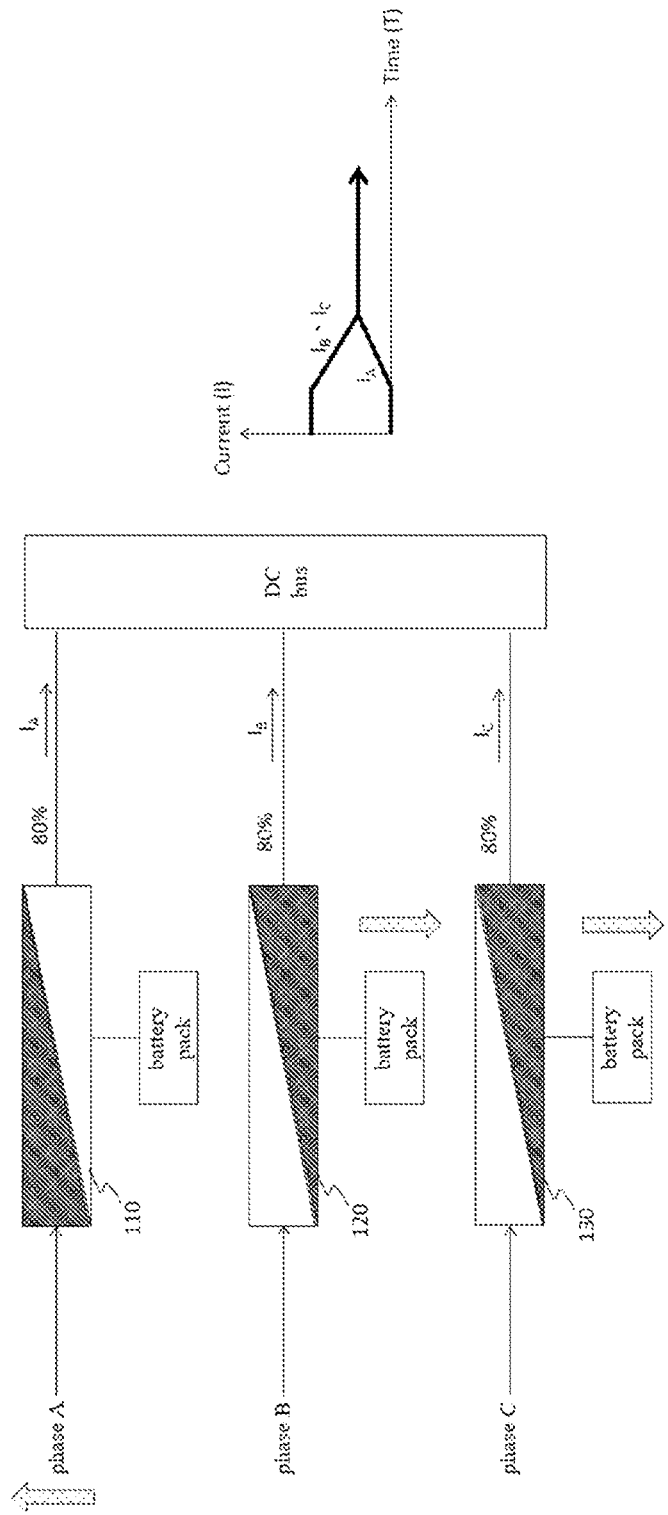
FIG. 4 shows the load rate variation and the output current variation of each power conversion circuit when the power conversion circuit 110 executes the second step of the huge current suppression.
Figure 9:
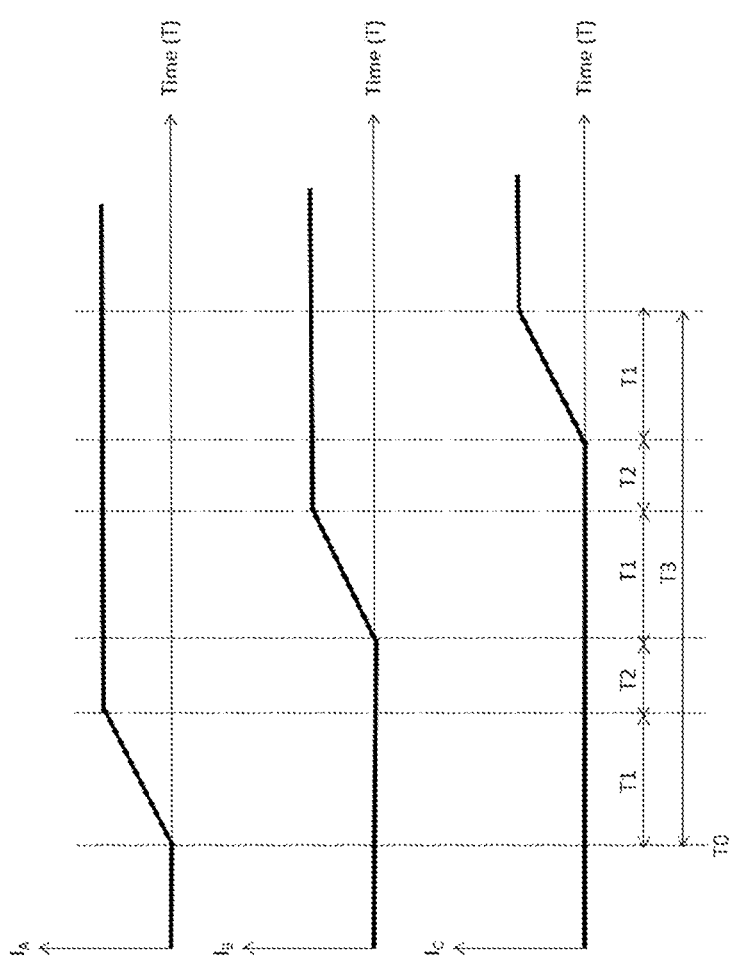
FIG. 9 shows the timing for the control circuit 180 to enable the power conversion circuits 110-130 to perform the AC-DC conversion and the output current variation of each power conversion circuit.

Next, referring to FIG. 4, in the second step, the control circuit 180 enables the AC-DC conversion of the power conversion circuit 110, and has all the power conversion circuits revert to their original load. As shown in FIG. 4, the load rate of the power conversion circuit 110 reverts to 80%, so the output current $I_A$ of the power conversion circuit 110 reverts to its original level. In addition, the load rate of the power conversion circuits 120 and 130 both revert to 80%, so the output currents $I_B$ and $I_C$ of the power conversion circuits 120 and 130 both revert to their original levels. Referring to FIG. 9, when the power conversion circuit 110 starts to perform the AC-DC conversion, the control circuit 180 further controls the power conversion circuit 110 to perform the soft-start operation for a predetermined period T1. Therefore, during the predetermined period T1, the magnitude of the output current $I_A$ of the power conversion circuit 110 gradually increases from time T0.

Figure 5:
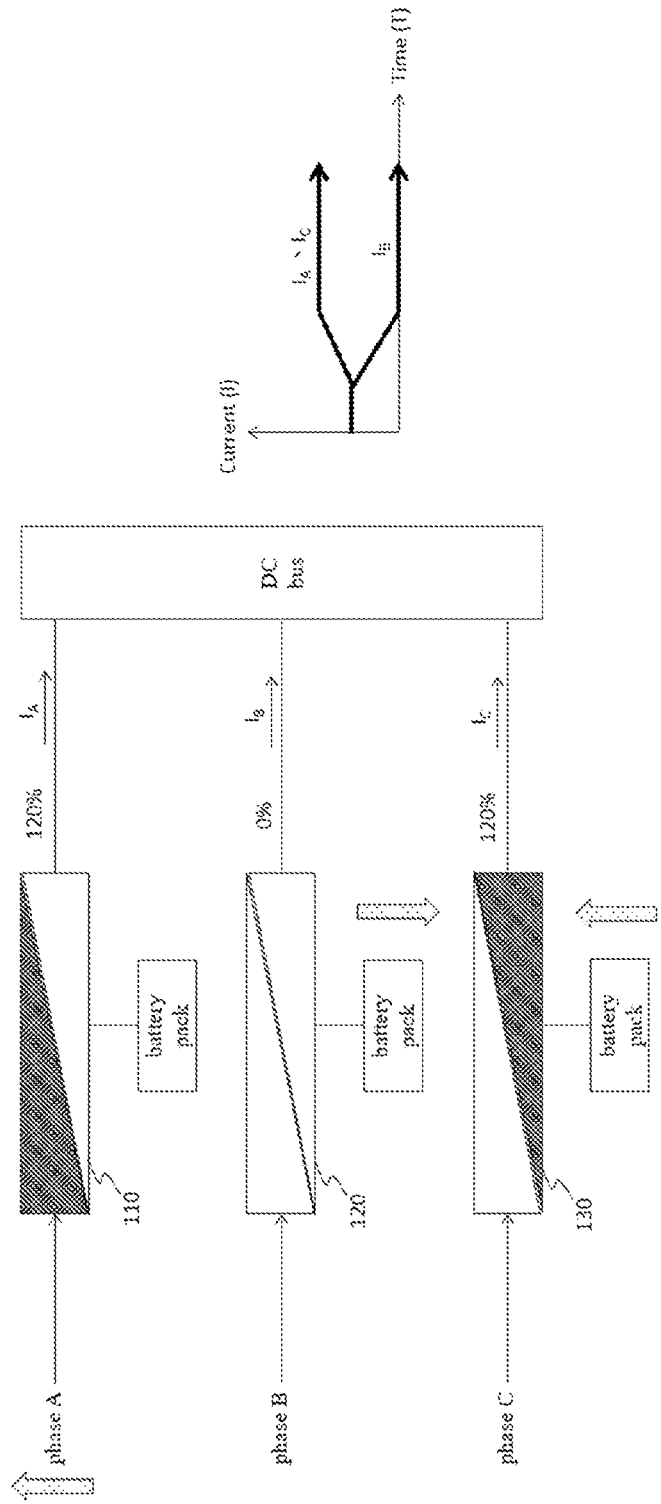
FIG. 5 shows the load rate variation and the output current variation of each power conversion circuit when the power conversion circuit 120 executes the first step of the huge current suppression.

Afterwards, the control circuit 180 performs the huge current suppression for the power conversion circuit 120 corresponding to phase B. The huge current suppression performed by the control circuit 180 for the power conversion circuit 120 comprises two steps. Referring to FIG. 5, in the first step, the control circuit 180 disables the DC-DC conversion of the power conversion circuit 120, and has the other two power conversion circuits (i.e., the power conversion circuits 110 and 130) to additionally share the original load of the disabled power conversion circuit 120. In this embodiment, the power conversion circuits 110 and 130 share the original load of the disabled power conversion circuit 120 equally. As shown in FIG. 5, the load rate of the power conversion circuit 120 is decreased to 0%, so the output current $I_B$ of the power conversion circuit 120 is decreased to 0. In addition, the load rate of the power conversion circuits 110 and 130 are both increased to 120%, so the output currents $I_A$ and $I_C$ of the power conversion circuits 110 and 130 are both increased.

Figure 6:
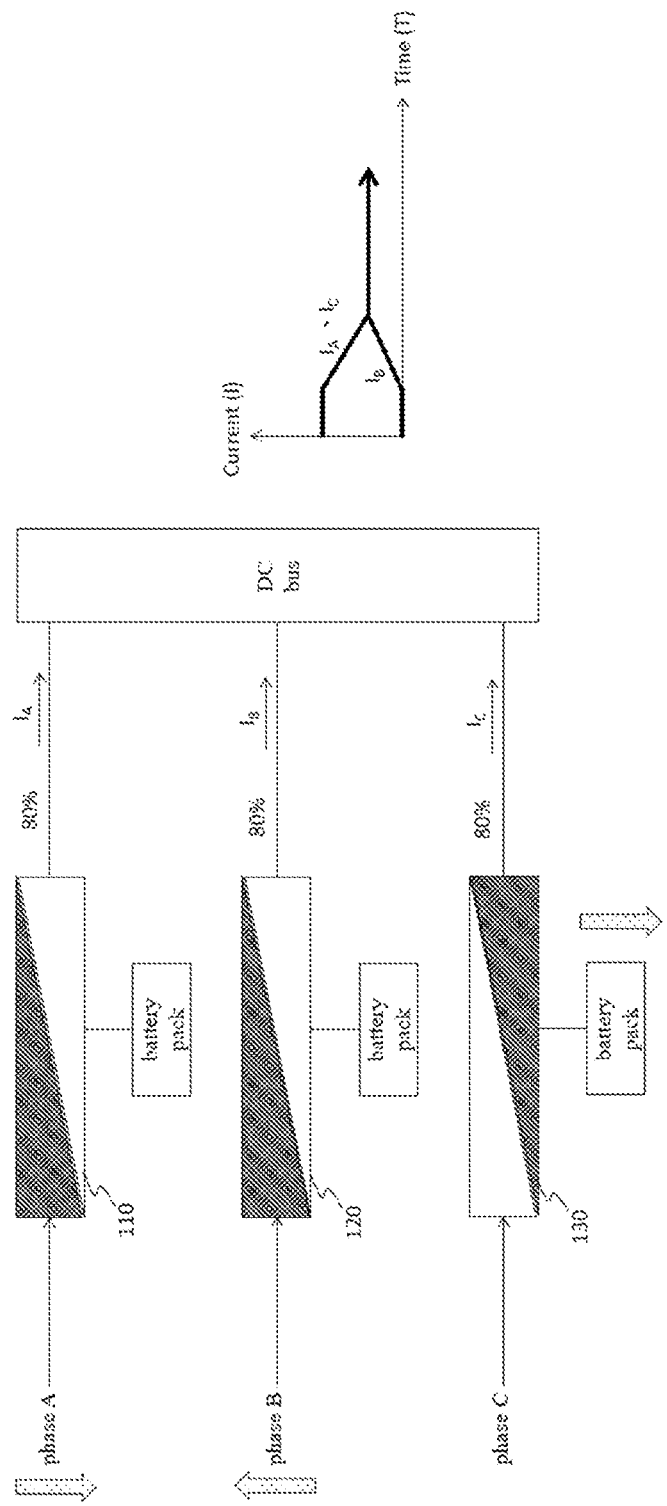
FIG. 6 shows the load rate variation and the output current variation of each power conversion circuit when the power conversion circuit 120 executes the second step of the huge current suppression.

Next, referring to FIG. 6, in the second step, the control circuit 180 enables the AC-DC conversion of the power conversion circuit 120, and has all the power conversion circuits revert to their original load. As shown in FIG. 6, the load rate of the power conversion circuit 120 reverts to 80%, so the output current $I_B$ of the power conversion circuit 120 reverts to its original level. In addition, the load rate of the power conversion circuits 110 and 130 both revert to 80%, so the output currents $I_A$ and $I_C$ of the power conversion circuits 110 and 130 both revert to their original levels. Referring to FIG. 9 again, when the power conversion circuit 120 starts to perform the AC-DC conversion, the control circuit 180 further controls the power conversion circuit 120 to perform the soft-start operation for a predetermined period T1. Therefore, during the predetermined period T1, the magnitude of the output current $I_B$ of the power conversion circuit 120 gradually increases.

Figure 7:
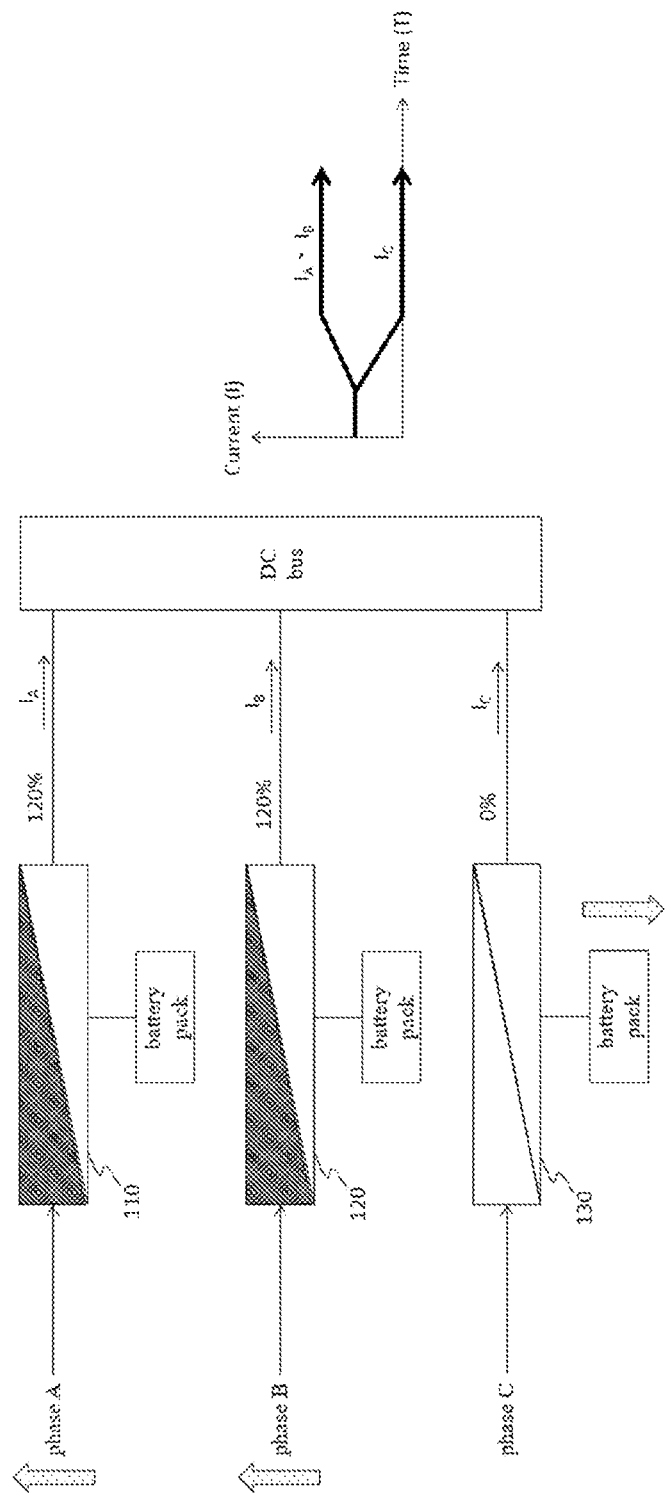
FIG. 7 shows the load rate variation and the output current variation of each power conversion circuit when the power conversion circuit 130 executes the first step of the huge current suppression.

After that, the control circuit 180 performs the huge current suppression for the power conversion circuit 130 corresponding to phase C. The huge current suppression performed by the control circuit 180 for the power conversion circuit 130 comprises two steps. Referring to FIG. 7, in the first step, the control circuit 180 disables the DC-DC conversion of the power conversion circuit 130, and has the other two power conversion circuits (i.e., the power conversion circuits 110 and 120) to additionally share the original load of the disabled power conversion circuit 130. In this embodiment, the power conversion circuits 110 and 120 share the original load of the disabled power conversion circuit 130 equally. As shown in FIG. 7, the load rate of the power conversion circuit 130 is decreased to 0%, so the output current $I_C$ of the power conversion circuit 130 is decreased to 0. In addition, the load rate of the power conversion circuits 110 and 120 are both increased to 120%, so the output currents $I_A$ and $I_B$ of the power conversion circuits 110 and 120 are both increased.

Figure 8:
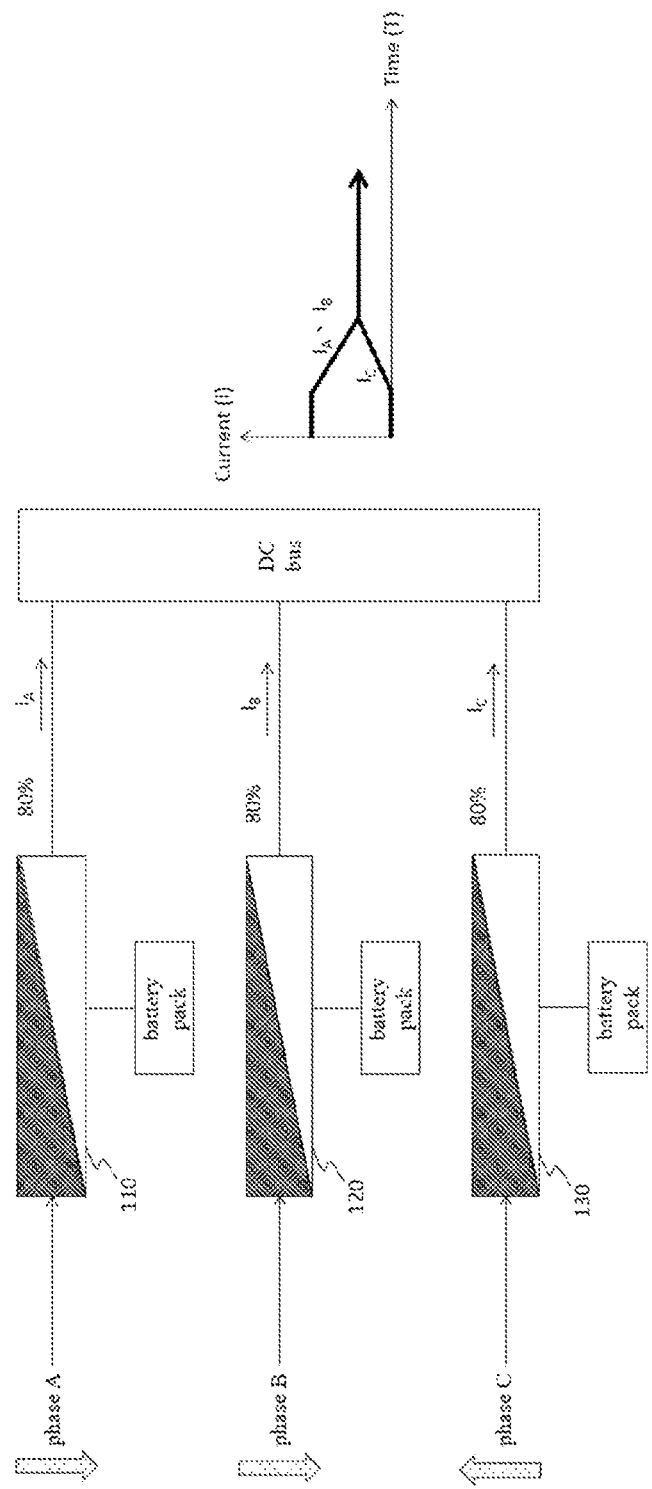
FIG. 8 shows the load rate variation and the output current variation of each power conversion circuit when the power conversion circuit 130 executes the second step of the huge current suppression.

Next, referring to FIG. 8, in the second step, the control circuit 180 enables the AC-DC conversion of the power conversion circuit 130, and has all the power conversion circuits revert to their original load. As shown in FIG. 8, the load rate of the power conversion circuit 130 reverts to 80%, so the output current $I_C$ of the power conversion circuit 130 reverts to its original level. In addition, the load rate of the power conversion circuits 110 and 120 both revert to 80%, so the output currents $I_A$ and $I_B$ of the power conversion circuits 110 and 120 both revert to their original levels. Referring to FIG. 9 again, when the power conversion circuit 130 starts to perform the AC-DC conversion, the control circuit 180 further controls the power conversion circuit 130 to perform the soft-start operation for a predetermined period T1. Therefore, during the predetermined period T1, the magnitude of the output current $I_C$ of the power conversion circuit 130 gradually increases.

FIG. 9 shows the timing for the control circuit 180 to enable the power conversion circuits 110-130 to perform the AC-DC conversion and the output current variation of each power conversion circuit. Referring to FIG. 9, it can be seen from the timing of the output currents $I_A$, $I_B$ and $I_C$ that the time for the power conversion circuits 110-130 to perform the soft-start operation (shown as T1) do not overlap with each other. In addition, it can also be seen from FIG. 9 that the time interval between each two adjacent soft-start operations in time is a predetermined period T2, and the predetermined period T2 is less than the predetermined period T1. Besides, assuming that the total time length from the beginning of the first soft-start operation to the end of the third soft-start operation is a predetermined period T3, then in a preferred embodiment, the predetermined period T3 is less than 40 wave periods of the three-phase power, and the predetermined period T1 is greater than or equal to 5 wave periods of the three-phase power. Assuming that the frequency of the above three-phase power is 60 Hz, one wave period is about 0.0167 seconds.

As can be seen from the above description, compared with the conventional three-phase uninterruptible power system which enables the AC-DC conversion of the three power conversion circuits simultaneously, the present invention enables the AC-DC conversion of the three power conversion circuits 110-130 by way of time-sharing, effectively dispersing the huge current impact on the grid source caused by the power conversion circuits 110-130 when switching to the AC-DC conversion. In addition, since the power conversion circuits 110-130 further perform a soft-start operation for a predetermined period T1 when starting to perform the AC-DC conversion, this further reduces the huge current impact on the grid source caused by the power conversion circuits 110-130 when switching to the AC-DC conversion. In this way, when the three-phase uninterruptible power system 100 of the present invention enters the online mode from the battery mode, it will not cause a huge current impact on the grid source, so that the grid source can keep the stability of its voltage and frequency.

Figure 10:
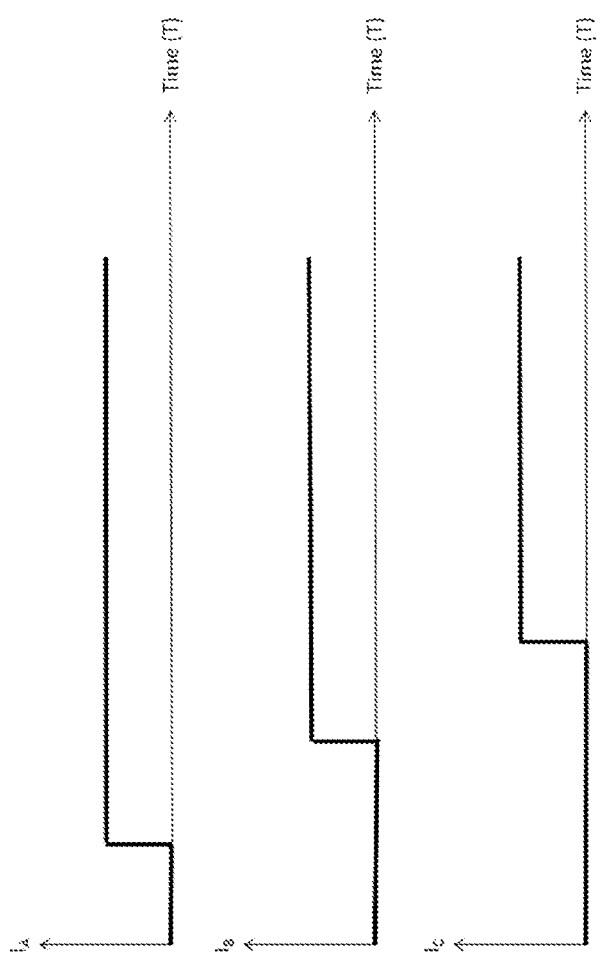
FIG. 10 shows the timing for the control circuit 180 to enable the power conversion circuits 110-130 to perform the AC-DC conversion and the output current variation of each power conversion circuit in another case.

Although in the above embodiments, the power conversion circuits 110-130 all have the soft-start function, this is not intended to limit the present invention. Those skilled in the art should know that even if the power conversion circuits 110-130 do not have the soft-start function, the huge current impact on the grid source caused by the power conversion circuits 110-130 when switching to the AC-DC conversion can still be dispersed so long as the AC-DC conversion of the power conversion circuits 110-130 are enabled by way of time-sharing. FIG. 10 shows the timing for the control circuit 180 to enable the power conversion circuits 110-130 to perform the AC-DC conversion and the output current variation of each power conversion circuit in another case.

It is worth mentioning that, although in the above embodiments, the predetermined sequence is phase A, phase B and phase C, this is not intended to limit the present invention.

Those skilled in the art should know that the predetermined sequence can be changed according to actual design requirements. For example, the predetermined sequence may be phase B, phase C and phase A. In addition, in the first step of the huge current suppression performed by each power conversion circuit, the other two power conversion circuits do not necessarily share the original load of the disabled power conversion circuit equally. For example, the other two power conversion circuits can share the original load of the disabled power conversion circuit according to a predetermined ratio.

Next, the actual circuit structure of each power conversion circuit in FIG. 1 will be introduced. Since the power conversion circuits 110-130 in FIG. 1 all adopt the same circuit structure, only the circuit structure of the power conversion circuit 110 will be described below.

Figure 11:
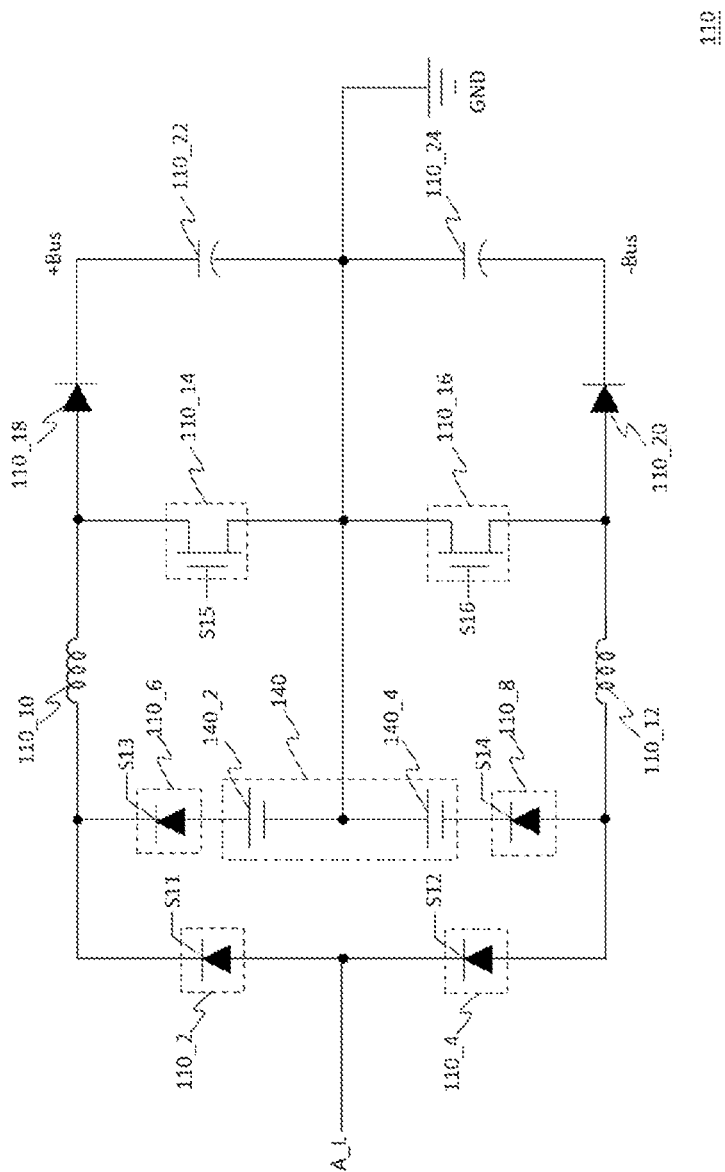
FIG. 11 shows the circuit structure of the power conversion circuit 110 and its electrical coupling with the battery pack 140.

FIG. 11 shows the circuit structure of the power conversion circuit 110 and its electrical coupling with the battery pack 140. Referring to FIG. 11, the battery pack 140 comprises batteries 140_2-140_4, and the power conversion circuit 110 comprises switches 110_2-110_8, inductors 110_10-110_12, switches 110_14-110_16, diodes 110_18-110_20 and capacitors 110_22-110_24. One terminal of the capacitor 110_22 is electrically coupled to a reference potential, and the other terminal is used as a positive DC bus (shown as +BUS). In this embodiment, the reference potential is a ground potential GND. However, in other embodiments, the reference potential used by the power conversion circuit 110 may be provided by the neutral wire of phase A. It is worth mentioning that the reference potential used by the power conversion circuits 120 and 130 can both be the ground potential GND, or be provided by the neutral wires of phase B and phase C, respectively.

Referring to FIG. 11 again, one terminal of the capacitor 110_24 is electrically coupled to the ground potential GND, and the other terminal is used as a negative DC bus (shown as −BUS). The cathode of the diode 110_18 is electrically coupled to the other terminal of the capacitor 110_22. The cathode of the diode 110_20 is electrically coupled to the other terminal of the capacitor 110_24. One terminal of the inductor 110_10 is electrically coupled to the anode of the diode 110_18. One terminal of the inductor 110_12 is electrically coupled to the anode of the diode 110_20. The switch 110_2 has a first terminal, a second terminal and a first control terminal, wherein the first terminal is electrically coupled to the other terminal of the inductor 110_10, the second terminal is electrically coupled to the live wire A_L of phase A, and the first control terminal receives a control signal S11 in the control signal group S1 provided by the control circuit 180. The switch 110_4 has a third terminal, a fourth terminal and a second control terminal, wherein the third terminal is also electrically coupled to the live wire A_L of phase A, the fourth terminal is electrically coupled to the other terminal of the inductor 110_12, and the second control terminal receives a control signal S12 in the control signal group S1 provided by the control circuit 180. It is worth mentioning that, for the power conversion circuit 120, it is electrically coupled to the live wire B_L of phase B rather than the live wire A_L of phase A. In addition, for the power conversion circuit 130, it is electrically coupled to the live wire C_L of phase C rather than the live wire A_L of phase A.

The switch 110_6 has a fifth terminal, a sixth terminal and a third control terminal, wherein the fifth terminal is electrically coupled to the other terminal of the inductor 110_10, the sixth terminal is electrically coupled to the positive terminal of the battery 140_2 in the battery pack 140, and the third control terminal receives a control signal S13 in the control signal group S1 provided by the control circuit 180. The switch 110_8 has a seventh terminal, an eighth terminal and a fourth control terminal, wherein the seventh terminal is electrically coupled to the negative terminal of the battery 140_4 in the battery pack 140, the eighth terminal is electrically coupled to the other terminal of the inductor 110_12, and the fourth control terminal receives a control signal S14 in the control signal group S1 provided by the control circuit 180. In this embodiment, the positive terminal of the battery 140_4 and the negative terminal of the battery 140_2 are electrically coupled to the ground potential GND.

The switch 110_14 has a ninth terminal, a tenth terminal and a fifth control terminal, wherein the ninth terminal is electrically coupled to the anode of the diode 110_18, the tenth terminal is electrically coupled to the ground potential GND, and the fifth control terminal receives a control signal S15 in the control signal group S1 provided by the control circuit 180. The switch 110_16 has an eleventh terminal, a twelfth terminal and a sixth control terminal, wherein the eleventh terminal is electrically coupled to the ground potential GND, the twelfth terminal is electrically coupled to the anode of the diode 110_20, and the sixth control terminal receives a control signal S16 in the control signal group S1 provided by the control circuit 180.

In this embodiment, each of the switches 110_2-110_8 is implemented by a silicon controlled rectifier (SCR). The cathode of the silicon controlled rectifier serves as the first terminal of the switch 110_2, the third terminal of the switch 110_4, the fifth terminal of the switch 110_6, and the seventh terminal of the switch 110_8. The anode of the silicon controlled rectifier serves as the second terminal of the switch 110_2, the fourth terminal of the switch 110_4, the sixth terminal of the switch 110_6, and the eighth terminal of the switch 110_8. The gate of the silicon controlled rectifier serves as the first control terminal of the switch 110_2, the second control terminal of the switch 110_4, the third control terminal of the switch 110_6, and the fourth control terminal of the switch 110_8.

In addition, in this embodiment, each of the switches 110_14-110_16 is implemented by a MOS transistor (i.e., metal oxide semiconductor field effect transistor, MOSFET). A source/drain of the MOS transistor serves as the ninth terminal of the switch 110_14 and the eleventh terminal of the switch 110_16. The other source/drain of the MOS transistor serves as the tenth terminal of the switch 110_14 and the twelfth terminal of the switch 110_16. The gate of the MOS transistor serves as the fifth control terminal of the switch 110_14 and the sixth control terminal of the switch 110_16.

Figure 12:
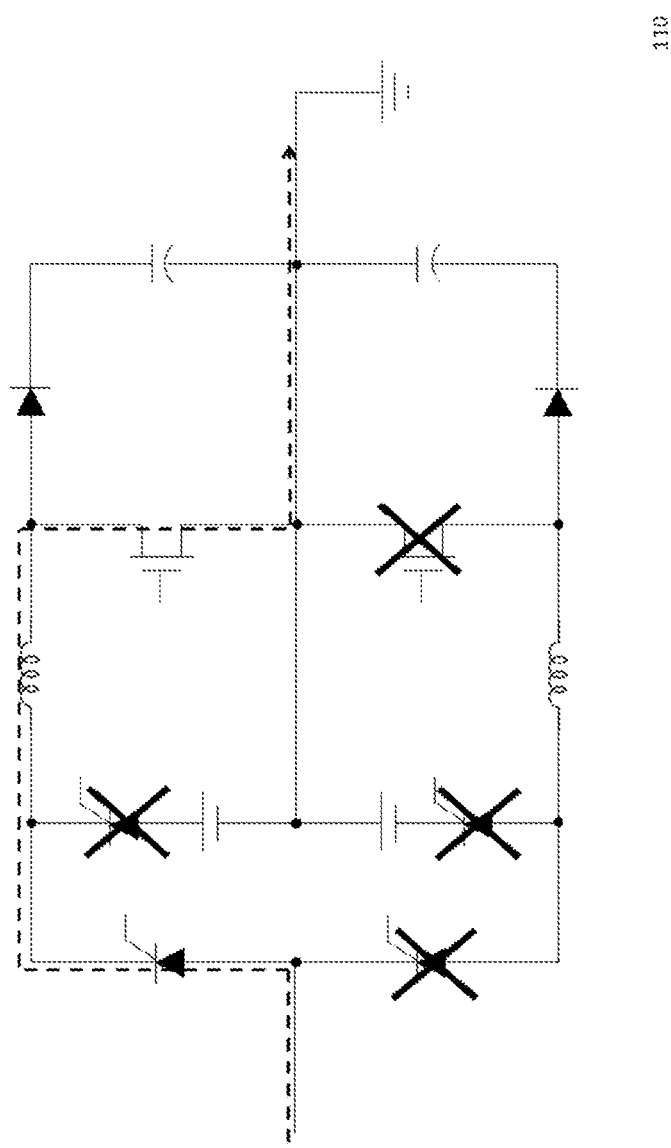
FIG. 12 shows the current path when the inductor 110_10 stores energy during a positive half cycle of the AC voltage outputted by the corresponding inverter of the power conversion circuit 110.
Figure 13:
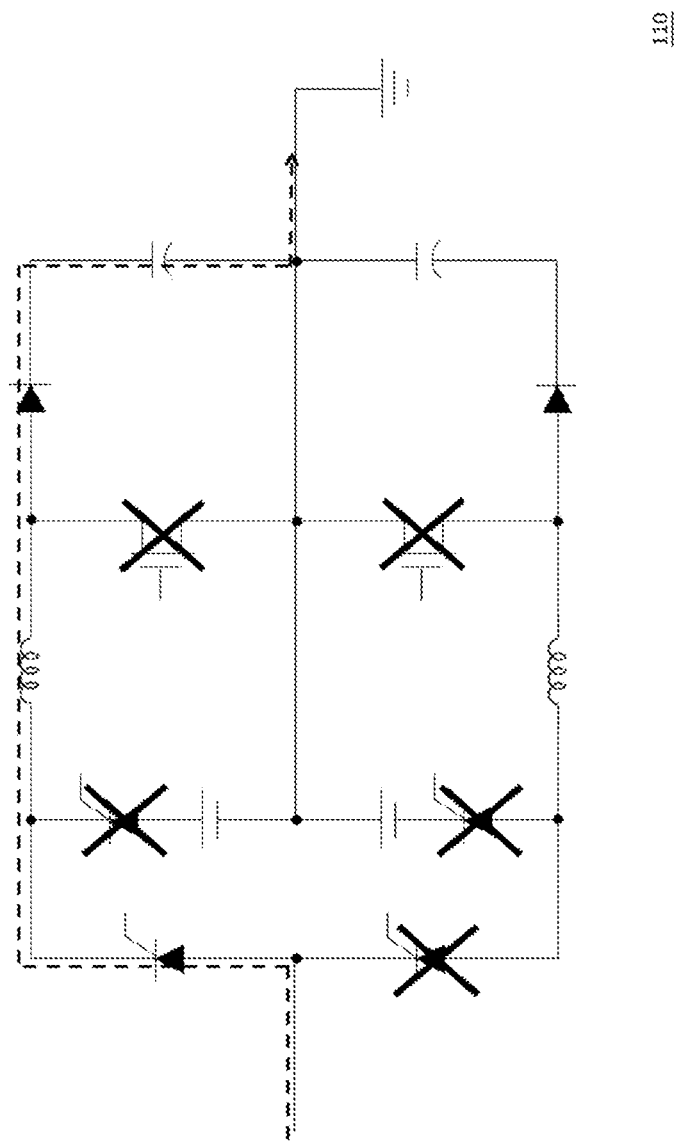
FIG. 13 shows the current path when the inductor 110_10 releases energy during a positive half cycle of the AC voltage outputted by the corresponding inverter of the power conversion circuit 110.

The operation of the power conversion circuit 110 performing the AC-DC conversion will be described below. Please Refer to FIGS. 12 and 13. FIG. 12 shows the current path when the inductor 110_10 of the power conversion circuit 110 stores energy during a positive half cycle of the AC voltage outputted by the corresponding inverter of the power conversion circuit 110. FIG. 13 shows the current path when the inductor 110_10 of the power conversion circuit 110 releases energy during a positive half cycle of the AC voltage outputted by the corresponding inverter of the power conversion circuit 110. It can be seen from FIGS. 12 and 13 that during a positive half cycle of the AC voltage outputted by the corresponding inverter of the power conversion circuit 110, the control signal S11 is used to turn on the switch 110_2, the control signal S12, the control signal S13, the control signal S14 and the control signal S16 are used to turn off the switch 110_4, the switch 110_6, the switch 110_8 and the switch 110_16, respectively, and the control signal S15 is used to control the switch 110_14 to continuously switch between the on state and the off state.

Figure 14:
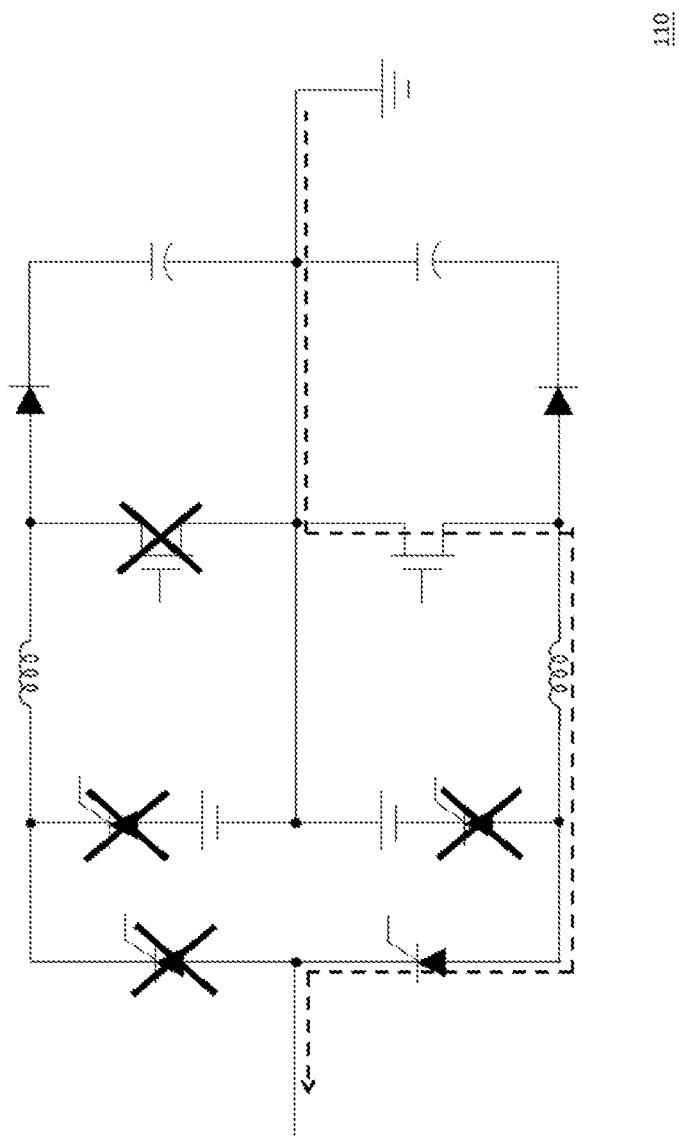
FIG. 14 shows the current path when the inductor 110_12 stores energy during a negative half cycle of the AC voltage outputted by the corresponding inverter of the power conversion circuit 110.
Figure 15:
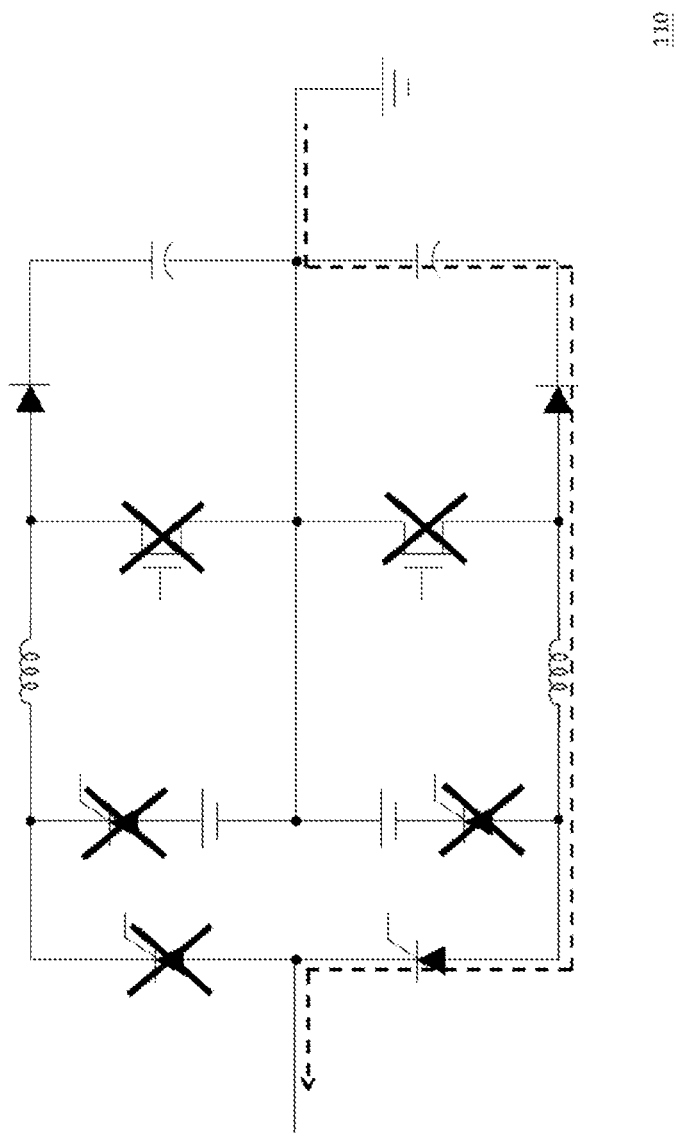
FIG. 15 shows the current path when the inductor 110_12 releases energy during a negative half cycle of the AC voltage outputted by the corresponding inverter of the power conversion circuit 110.

Please refer to FIGS. 14 and 15. FIG. 14 shows the current path when the inductor 110_12 of the power conversion circuit 110 stores energy during a negative half cycle of the AC voltage outputted by the corresponding inverter of the power conversion circuit 110. FIG. 15 shows the current path when the inductor 110_12 of the power conversion circuit 110 releases energy during a negative half cycle of the AC voltage outputted by the corresponding inverter of the power conversion circuit 110. It can be seen from FIGS. 14 and 15 that during a negative half cycle of the AC voltage outputted by the corresponding inverter of the power conversion circuit 110, the control signal S12 is used to turn on the switch 110_4, the control signal S11, the control signal S13, the control signal S14 and the control signal S15 are used to turn off the switch 110_2, the switch 110_6, the switch 110_8 and the switch 110_14, respectively, and the control signal S16 is used to control the switch 110_16 to continuously switch between the on state and the off state.

In this embodiment, the control signals S15 and S16 are pulse width modulation signals (PWM signals), and the above soft-start operation is performed by lowering the duty cycle of the control signals S15 and S16.

Figure 16:
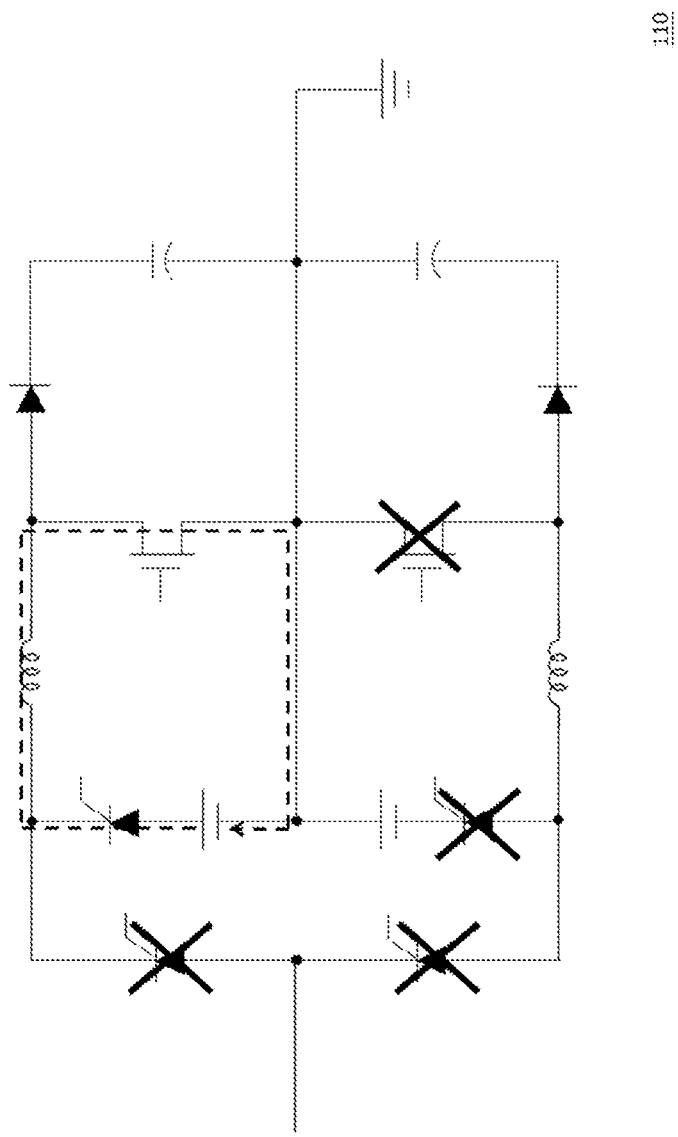
FIG. 16 shows the current path when the inductor 110_10 stores energy during a positive half cycle of the AC voltage outputted by the corresponding inverter of the power conversion circuit 110.
Figure 17:
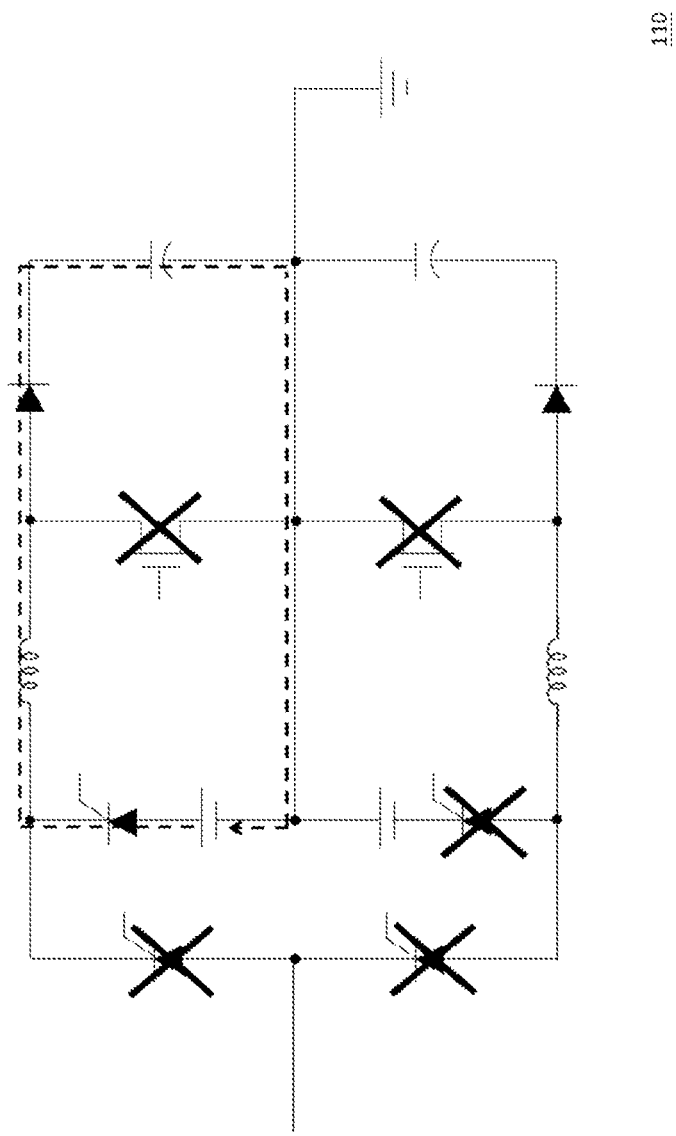
FIG. 17 shows the current path when the inductor 110_10 releases energy during a positive half cycle of the AC voltage outputted by the corresponding inverter of the power conversion circuit 110.

The operation of the power conversion circuit 110 performing the DC-DC conversion will be described below. Please refer to FIGS. 16 and 17. FIG. 16 shows the current path when the inductor 110_10 of the power conversion circuit 110 stores energy during a positive half cycle of the AC voltage outputted by the corresponding inverter of the power conversion circuit 110. FIG. 17 shows the current path when the inductor 110_10 of the power conversion circuit 110 releases energy during a positive half cycle of the AC voltage outputted by the corresponding inverter of the power conversion circuit 110. It can be seen from FIG. 16 and FIG. 17 that during a positive half cycle of the AC voltage outputted by the corresponding inverter of the power conversion circuit 110, the control signal S13 is used to turn on the switch 1106, the control signal S11, the control signal S12, the control signal S14 and the control signal S16 are used to turn off the switch 110_2, the switch 110_4, the switch 110_8 and the switch 110_16, respectively, and the control signal S15 is used to control the switch 110_14 to continuously switch between the on state and the off state.

Figure 18:
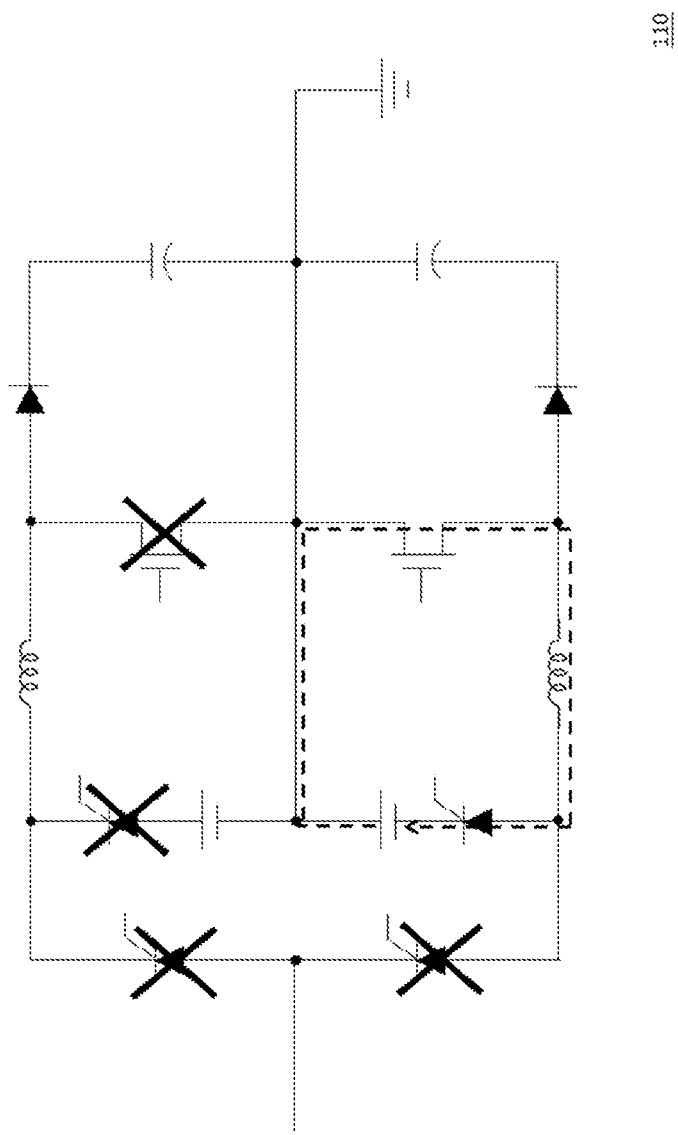
FIG. 18 shows the current path when the inductor 110_12 stores energy during a negative half cycle of the AC voltage outputted by the corresponding inverter of the power conversion circuit 110.
Figure 19:
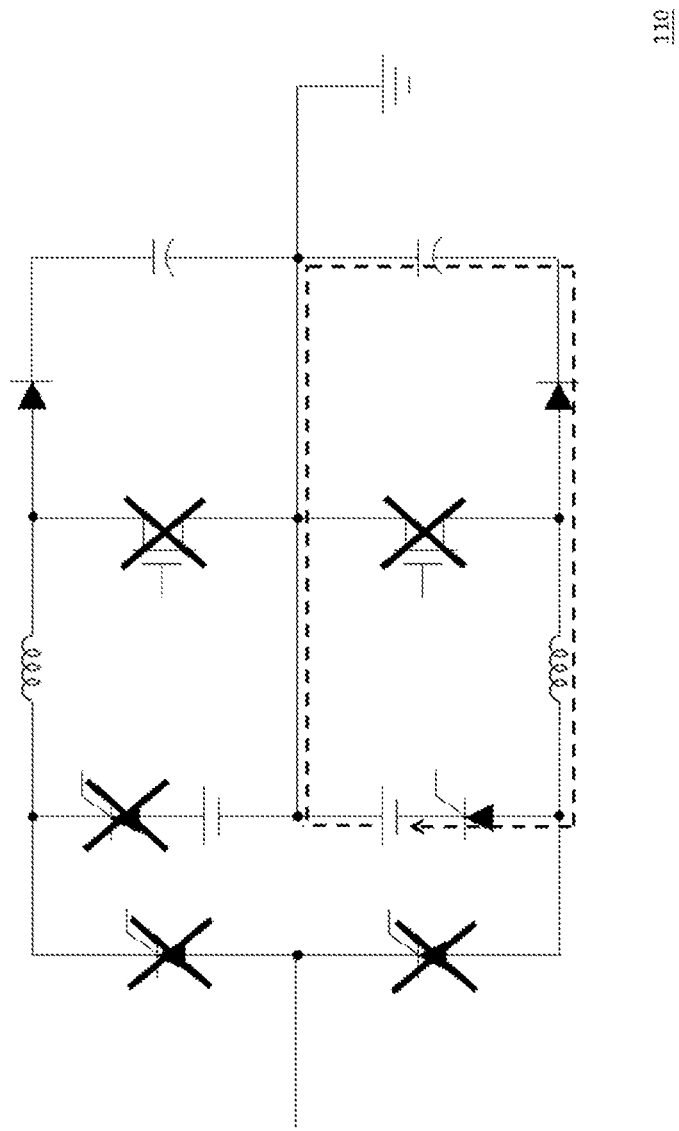
FIG. 19 shows the current path when the inductor 110_12 releases energy during a negative half cycle of the AC voltage outputted by the corresponding inverter of the power conversion circuit 110.

Please refer to FIGS. 18 and 19. FIG. 18 shows the current path when the inductor 110_12 of the power conversion circuit 110 stores energy during a negative half cycle of the AC voltage outputted by the corresponding inverter of the power conversion circuit 110. FIG. 19 shows the current path when the inductor 110_12 of the power conversion circuit 110 releases energy during a negative half cycle of the AC voltage outputted by the corresponding inverter of the power conversion circuit 110. It can be seen from FIGS. 18 and 19 that the control signal S14 is used to turn on the switch 110_8, the control signal S11, the control signal S12, the control signal S13 and the control signal S15 are used to turn off the switch 1102, the switch 110_4, the switch 110_6 and the switch 110_14, respectively, and the control signal S16 is used to control the switch 110_16 to continuously switch between the on state and the off state.

Figure 20:
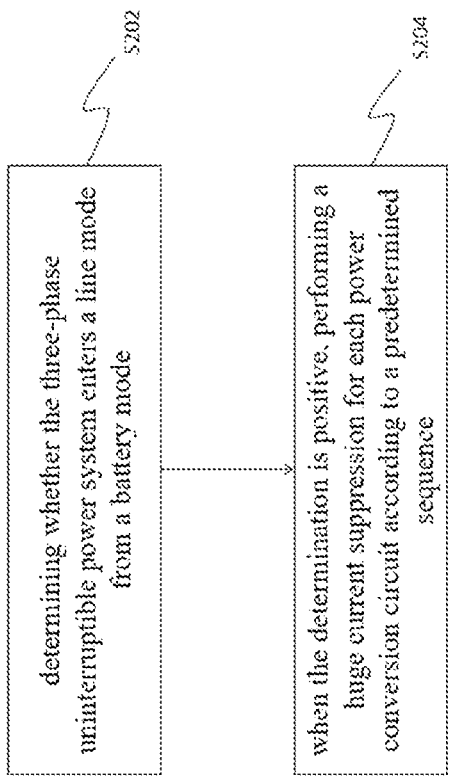
FIG. 20 shows the steps of the operation method of the three-phase uninterruptible power system according to an embodiment of the present invention.
Figure 21:
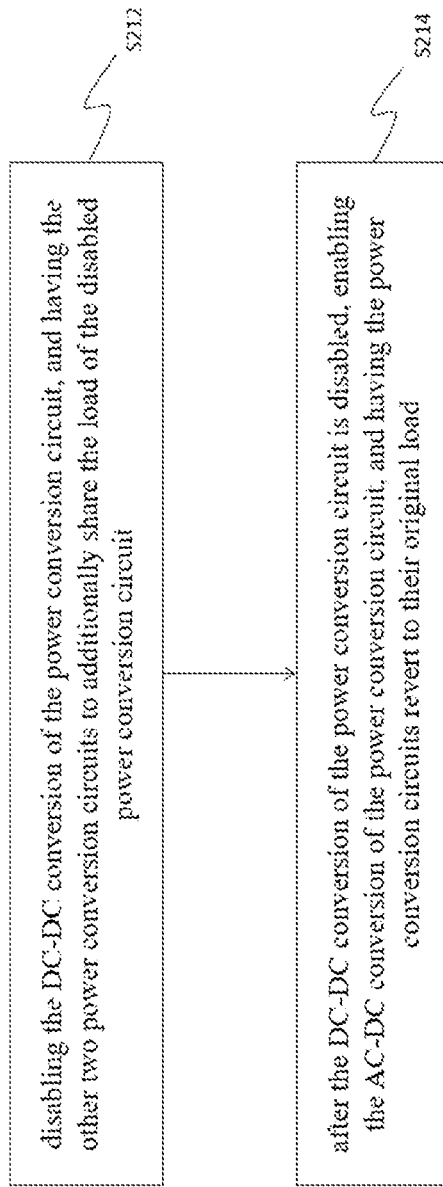
FIG. 21 shows the steps of the huge current suppression.

According to the above description, those skilled in the art should be able to summarize some basic operation of the three-phase uninterruptible power system of the present invention, as shown in FIGS. 20 and 21. FIG. 20 shows the steps of the operation method of the three-phase uninterruptible power system according to an embodiment of the present invention. FIG. 21 shows the steps of the huge current suppression. The three-phase uninterruptible power system comprises a DC bus and three power conversion circuits. Each power conversion circuit is electrically coupled to the DC bus, a battery pack and one phase of a three-phase power. Each power conversion circuit is configured to perform the AC-DC conversion and the DC-DC conversion. Referring to FIG. 20, the operation method comprises the following steps: determining whether the three-phase uninterruptible power system enters a line mode from a battery mode (as shown in step S202); and when the determination is positive, performing a huge current suppression for each power conversion circuit according to a predetermined sequence (as shown in step S204). Referring to FIG. 21, the huge current suppression performed by the control circuit 180 for any of the power conversion circuits comprises the following steps: disabling the DC-DC conversion of the power conversion circuit, and having the other two power conversion circuits to additionally share the original load of the disabled power conversion circuit (as shown in step S212); and after the DC-DC conversion of the power conversion circuit is disabled, enabling the AC-DC conversion of the power conversion circuit, and having the power conversion circuits revert to their original load (as shown in step S214).

In summary, since the present invention enables the AC-DC conversion of the three power conversion circuits 110-130 by way of time-sharing, the huge current impact on the grid source caused by the power conversion circuits 110-130 when switching to the AC-DC conversion can be effectively dispersed. In this way, when the three-phase uninterruptible power system 100 of the present invention enters the online mode from the battery mode, it will not cause a huge current impact on the grid source, so that the grid source can keep the stability of its voltage and frequency.

While the disclosure has been described by way of example and in terms of the preferred embodiments, it is to be understood that the disclosure is not limited to the disclosed embodiments. To the contrary, it is intterminaled to cover various modifications and similar arrangements (as would be apparent to those skilled in the art). Therefore, the scope of the appterminaled claims should be accorded the broadest interpretation so as to encompass all such modifications and similar arrangements.

What is claimed is:

1. A three-phase uninterruptible power system, comprising:
   a DC bus;
   three power conversion circuits, each power conversion circuit being electrically coupled to the DC bus, a battery pack and one phase of a three-phase power, and each power conversion circuit being configured to perform an AC-DC conversion and a DC-DC conversion; and
   a control circuit, electrically coupled to the power conversion circuits, wherein when the three-phase uninterruptible power system enters a line mode from a battery mode, the control circuit performs a huge current suppression for each power conversion circuit according to a predetermined sequence, and the steps of the huge current suppression performed for any of the power conversion circuits comprise:
   disabling the DC-DC conversion of the power conversion circuit, and having the other two power conversion circuits to additionally share the original load of the disabled power conversion circuit; and after the DC-DC conversion of the power conversion circuit is disabled, enabling the AC-DC conversion of the power conversion circuit, and having the power conversion circuits revert to their original load.

2. The three-phase uninterruptible power system as claimed in claim 1, wherein in the huge current suppression the other two power conversion circuits share the original load of the disabled power conversion circuit equally.

3. The three-phase uninterruptible power system as claimed in claim 1, wherein each power conversion circuit further performs a soft-start operation for a first predetermined period when starting to perform the AC-DC conversion.

4. The three-phase uninterruptible power system as claimed in claim 3, wherein the time for the power conversion circuits to perform the soft-start operation do not overlap with each other.

5. The three-phase uninterruptible power system as claimed in claim 4, wherein the time interval between each two adjacent soft-start operations in time is a second predetermined period, and the second predetermined period is less than the first predetermined period.

6. The three-phase uninterruptible power system as claimed in claim 5, wherein the total time length from the beginning of the first soft-start operation to the end of the third soft-start operation is a third predetermined period, the third predetermined period is less than 40 wave periods of the three-phase power, and the first predetermined period is greater than or equal to 5 wave periods of the three-phase power.

7. The three-phase uninterruptible power system as claimed in claim 3, wherein each power conversion circuit comprises:
a first capacitor, one terminal of which being electrically coupled to a reference potential;
a second capacitor, one terminal of which being electrically coupled to the reference potential;
a first diode, the cathode of which being electrically coupled to the other terminal of the first capacitor;
a second diode, the cathode of which being electrically coupled to the other terminal of the second capacitor;
a first inductor, one terminal of which being electrically coupled to the anode of the first diode;
a second inductor, one terminal of which being electrically coupled to the anode of the second diode;
a first switch, having a first terminal, a second terminal and a first control terminal, the first terminal being electrically coupled to the other terminal of the first inductor, the second terminal being electrically coupled to a live wire of one phase of the three-phase power, and the first control terminal being configured for receiving a first control signal provided by the control circuit;
a second switch, having a third terminal, a fourth terminal and a second control terminal, the third terminal being electrically coupled to the live wire, the fourth terminal being electrically coupled to the other terminal of the second inductor, and the second control terminal being configured for receiving a second control signal provided by the control circuit;
a third switch, having a fifth terminal, a sixth terminal and a third control terminal, the fifth terminal being electrically coupled to the other terminal of the first inductor, the sixth terminal being electrically coupled to a positive terminal of a first battery of a corresponding battery pack, and the third control terminal being configured for receiving a third control signal provided by the control circuit;
a fourth switch, having a seventh terminal, an eighth terminal and a fourth control terminal, the seventh terminal being electrically coupled to a negative terminal of a second battery of the corresponding battery pack, the eighth terminal being electrically coupled to the other terminal of the second inductor, and the fourth control terminal being configured for receiving a fourth control signal provided by the control circuit, wherein a positive terminal of the second battery is electrically coupled to the reference potential and a negative terminal of the first battery;
a fifth switch, having a ninth terminal, a tenth terminal and a fifth control terminal, the ninth terminal being electrically coupled to the anode of the first diode, the tenth terminal being electrically coupled to the reference potential, and the fifth control terminal being configured for receiving a fifth control signal provided by the control circuit; and
a sixth switch, having an eleventh terminal, a twelfth terminal and a sixth control terminal, the eleventh terminal being electrically coupled to the reference potential, the twelfth terminal being electrically coupled to the anode of the second diode, and the sixth control terminal being configured for receiving a sixth control signal provided by the control circuit.

8. The three-phase uninterruptible power system as claimed in claim 7, wherein when each power conversion circuit performs the AC-DC conversion, during a positive half cycle of the AC voltage outputted by its corresponding inverter the first control signal is used to turn on the first switch, the second control signal, the third control signal, the fourth control signal and the sixth control signal are used to turn off the second switch, the third switch, the fourth switch and the sixth switch, respectively, and the fifth control signal is used to control the fifth switch to continuously switch between an on state and an off state.

9. The three-phase uninterruptible power system as claimed in claim 8, wherein when each power conversion circuit performs the AC-DC conversion, during a negative half cycle of the AC voltage outputted by its corresponding inverter the second control signal is used to turn on the second switch, the first control signal, the third control signal, the fourth control signal and the fifth control signal are used to turn off the first switch, the third switch, the fourth switch and the fifth switch, respectively, and the sixth control signal is used to control the sixth switch to continuously switch between the on state and the off state.

10. The three-phase uninterruptible power system as claimed in claim 9, wherein the fifth control signal and the sixth control signal are pulse width modulation signals, and the soft-start operation is performed by lowering the duty cycle of the fifth control signal and the sixth control signal.

11. The three-phase uninterruptible power system as claimed in claim 7, wherein when each power conversion circuit performs the DC-DC conversion, during a positive half cycle of the AC voltage outputted by its corresponding inverter the third control signal is used to turn on the third switch, the first control signal, the second control signal, the fourth control signal and the sixth control signal are used to turn off the first switch, the second switch, the fourth switch and the sixth switch, respectively, and the fifth control signal is used to control the fifth switch to continuously switch between an on state and an off state.

12. The three-phase uninterruptible power system as claimed in claim 11, wherein when each power conversion circuit performs the DC-DC conversion, during a negative half cycle of the AC voltage outputted by its corresponding inverter the fourth control signal is used to turn on the fourth switch, the first control signal, the second control signal, the third control signal and the fifth control signal are used to turn off the first switch, the second switch, the third switch and the fifth switch, respectively, and the sixth control signal is used to control the sixth switch to continuously switch between the on state and the off state.

13. An operation method of a three-phase uninterruptible power system, the three-phase uninterruptible power system comprising a DC bus and three power conversion circuits, each power conversion circuit being electrically coupled to the DC bus, a battery pack and one phase of a three-phase power, and each power conversion circuit being configured to perform an AC-DC conversion and a DC-DC conversion, the operation method comprising the steps of:
  determining whether the three-phase uninterruptible power system enters a line mode from a battery mode; and
  when the determination is positive, performing a huge current suppression for each power conversion circuit according to a predetermined sequence, the huge current suppression performed for any of the power conversion circuits comprising the steps of:
    disabling the DC-DC conversion of the power conversion circuit, and having the other two power conversion circuits to additionally share the original load of the disabled power conversion circuit; and
    after the DC-DC conversion of the power conversion circuit is disabled, enabling the AC-DC conversion of the power conversion circuit, and having the power conversion circuits revert to their original load.

14. The operation method of the three-phase uninterruptible power system as claimed in claim 13, wherein in the huge current suppression the other two power conversion circuits share the original load of the disabled power conversion circuit equally.

15. The operation method of the three-phase uninterruptible power system as claimed in claim 13, wherein each power conversion circuit further performs a soft-start operation for a first predetermined period when starting to perform the AC-DC conversion.

16. The operation method of the three-phase uninterruptible power system as claimed in claim 15, wherein the time for the power conversion circuits to perform the soft-start operation do not overlap with each other.

17. The operation method of the three-phase uninterruptible power system as claimed in claim 16, wherein the time interval between each two adjacent soft-start operations in time is a second predetermined period, and the second predetermined period is less than the first predetermined period.

18. The operation method of the three-phase uninterruptible power system as claimed in claim 17, wherein the total time length from the beginning of the first soft-start operation to the end of the third soft-start operation is a third predetermined period, the third predetermined period is less than 40 wave periods of the three-phase power, and the first predetermined period is greater than or equal to 5 wave periods of the three-phase power.

* * * * *